United States Patent
Reyes et al.

(10) Patent No.: US 11,572,501 B2
(45) Date of Patent: Feb. 7, 2023

(54) NANOSIZED PARTICULATES FOR DOWNHOLE APPLICATIONS

(71) Applicant: Halliburton Energy Services, Inc., Houston, TX (US)

(72) Inventors: Enrique A. Reyes, Tomball, TX (US); Aaron M. Beuterbaugh, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 6 days.

(21) Appl. No.: 16/499,608

(22) PCT Filed: May 2, 2017

(86) PCT No.: PCT/US2017/030631
§ 371 (c)(1),
(2) Date: Sep. 30, 2019

(87) PCT Pub. No.: WO2018/203884
PCT Pub. Date: Nov. 8, 2018

(65) Prior Publication Data
US 2020/0102492 A1    Apr. 2, 2020

(51) Int. Cl.
| C09K 8/76 | (2006.01) |
| C09K 8/66 | (2006.01) |
| C09K 8/68 | (2006.01) |
| E21B 33/138 | (2006.01) |
| E21B 43/26 | (2006.01) |

(52) U.S. Cl.
CPC ............... *C09K 8/76* (2013.01); *C09K 8/665* (2013.01); *C09K 8/68* (2013.01); *E21B 33/138* (2013.01); *E21B 43/26* (2013.01); *C09K 2208/10* (2013.01)

(58) Field of Classification Search
CPC . C09K 8/76; C09K 8/665; C09K 8/68; C09K 2208/10; C09K 8/70; C09K 8/845; C09K 8/86; C09K 8/92; E21B 33/138; E21B 43/26
See application file for complete search history.

(56) References Cited

U.S. PATENT DOCUMENTS

| 7,036,587 | B2 | 5/2006 | Munoz, Jr. et al. |
| 8,183,179 | B2 | 5/2012 | Garcia-Lopez de Victoria et al. |
| 8,657,003 | B2 | 2/2014 | Welton et al. |
| 8,697,612 | B2 | 4/2014 | Todd et al. |
| 8,714,249 | B1 | 5/2014 | Tang |
| 8,853,137 | B2 | 10/2014 | Todd et al. |
| 9,023,770 | B2 | 5/2015 | Todd et al. |
| 9,255,468 | B2 | 2/2016 | Reyes et al. |
| 2005/0167105 | A1 | 8/2005 | Roddy |
| 2009/0025933 | A1 | 1/2009 | Garcia-Lopez de Victoria et al. |
| 2009/0038799 | A1* | 2/2009 | Garcia-Lopez de Victoria ........... C09K 8/80 166/280.2 |
| 2011/0028358 | A1 | 2/2011 | Welton et al. |
| 2011/0168395 | A1 | 7/2011 | Welton et al. |
| 2012/0024530 | A1* | 2/2012 | Todd .................. C09K 8/03 166/308.1 |
| 2013/0023449 | A1* | 1/2013 | Heath .................. C09K 8/52 507/221 |
| 2013/0081813 | A1 | 4/2013 | Liang et al. |
| 2013/0190441 | A1 | 7/2013 | Vucak et al. |
| 2014/0171345 | A1* | 6/2014 | Steiner .................. C09K 8/536 507/90 |
| 2014/0336089 | A1 | 11/2014 | Heath et al. |
| 2016/0340516 | A1 | 11/2016 | Beuterbaugh et al. |

FOREIGN PATENT DOCUMENTS

| BR | PI0823508 A2 | 10/2013 | |
| WO | 2009016549 A1 | 2/2009 | |
| WO | 2012127191 A1 | 9/2012 | |
| WO | 2014164835 A1 | 10/2014 | |
| WO | 2015088561 A1 | 6/2015 | |
| WO | WO-2016002516 A1 * | 1/2016 | ............... B08B 3/08 |

OTHER PUBLICATIONS

Pairat, R. et al. "Precipitation and dissolution of calcium-ATMP precipitates for the inhibition of scale formation in porous media." Langmuir, 1997, vol. 13, No. 6, pp. 1791-1798.*
International Search Report and Written Opinion for PCT application No. PCT/US2017/030631 dated Aug. 2, 2018. 10 pages.
Office Action for Saudi Arabian Patent Application No. 519410095 dated Nov. 15, 2021.

* cited by examiner

*Primary Examiner* — Kumar R Bhushan
(74) *Attorney, Agent, or Firm* — Kilpatrick Townsend & Stockton LLP

(57) ABSTRACT

Well treatment operation comprises introducing nanosized particulates into a formation. The nanosized particulates are synthesized by combining PMIDA, a calcium source, a pH adjusting agent, and an aqueous medium. This combination results in a degradable (i.e., dissolvable) solid that can be used in heterogeneous formations like shale type rock reservoirs, as well as sedimentary rock formations like clastic, siliclastic, sandstone, limestone, calcite, dolomite, and chalk formations, and formations where there is large fluid leak-off due to stimulation treatments. The disclosed particulates may also be used for acidizing treatments in mature fields and deep water formations commonly characterized by high permeability matrices. The solubility of the particulates advantageously allows the material to act as a temporary agent having a lifespan that is a function of temperature, water flux, and pH, making it adaptable to various reservoir conditions with minimal to no risk of adverse effects on the reservoir.

11 Claims, 3 Drawing Sheets

NANOSIZED PARTICULATES FOR DOWNHOLE APPLICATIONS

TECHNICAL FIELD

The exemplary embodiments disclosed herein relate generally to nanosized particulates, synthesis thereof, and uses therefor in downhole applications, particularly for controlling fluid loss in reservoir stimulation operations, such as hydraulic fracturing, acid fracturing, and near wellbore area operations, including without limitation matrix acidizing treatments.

BACKGROUND

Fracturing operations generally involve pumping a fluid into a wellbore at high pressure to create and propagate fissures or fractures in a subterranean formation. This process of creating or inducing fractures or enhancing natural fractures in the formation is commonly referred to as a stimulation treatment and may be performed in multiple stages in order to achieve a desired network of fractures. Other types of treatment fluids may also be used depending on the downhole operation, such as drilling operations, perforation operations, sand control treatments, water control treatments, wellbore clean-out treatments, organic scale deposits and inorganic scale treatments, and the like. For certain fracturing operations requiring considerably large volumes of liquids, such as horizontal hydraulic fracturing, the treatment fluid is typically a slurry comprising about 90% water, 9.5% proppant (e.g., sand), and 0.5% chemical additives.

Fracturing is typically performed within isolated intervals or zones along the wellbore where oil and/or gas is present in the formation. Within a particular interval, the formation may have varying degrees of permeability, porosity, geochemical and/or geostratigraphic characteristics, resulting in certain portions of the interval having lower flow resistance than other portions of the interval. Consequently, more of the treatment fluid may enter portions of the interval with lower flow resistance compared to portions with higher flow resistance, such that the treatment fluid may not propagate or induce the targeted fractures as desired.

One way to offset any uneven distribution of treatment fluid is by blocking further flow of treatment fluid into the lower flow resistance portions once those portions have been treated, thereby diverting the treatment fluid into higher flow resistance portions. A number of techniques exist for diverting treatment fluids to higher flow resistance portions, including by introducing appropriately sized solid particles or particulates into the interval to plug the lower flow resistance portions once they have been treated.

In addition to diverting fluid flow, particulates may also be used as additives in treatment fluids to control fluid loss resulting from fluid migration or leak-off into the subterranean formation. Uncontrolled fluid loss in fracturing operations may lead to incomplete fracture length and/or ineffective fracture geometries. It may then be necessary to use larger volumes of treatment fluid to achieve proper fracture length and induce the desired fracture networks. The introduction of particulates into the formation can control this fluid loss by physically blocking the pore spaces, pore throats, vugs, and/or natural fractures in the formation material, thereby preventing fluid from leaking off into the formation.

However, the use of particulates as fluid loss control materials may have limitations. For example, if the sizes of the particulates are not optimized for the pore spaces, pore throats, or microfractures (mean width <1000 μm) in a particular formation, the particulates may invade into the interior of the formation, potentially causing formation damage (i.e., hamper hydraulic conductivity). Additionally, once fluid loss control is no longer needed, remedial treatments may be required to remove the particulates to allow the well to begin production, or remove the damage. Nevertheless, particulates may become entrapped within the pore spaces, pore throats, microfractures, and/or discontinuities (thus inhibiting the production of the reservoir), and may be difficult and/or costly to remove.

Accordingly, a need exists for improved fluid loss control material for downhole operations, particularly fracturing operations.

BRIEF DESCRIPTION OF THE DRAWINGS

For a more complete understanding of the exemplary disclosed embodiments, and for further advantages thereof, reference is now made to the following description taken in conjunction with the accompanying drawings in which.

DESCRIPTION OF EXEMPLARY EMBODIMENTS

The following discussion is presented to enable a person ordinarily skilled in the art to synthesize and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. Accordingly, the disclosed embodiments are not intended to be limited to the particular embodiments shown, but are to be accorded the widest scope consistent with the principles and features disclosed herein.

As mentioned above, the embodiments disclosed herein relate to nanosized particulates, the synthesis thereof, and the various uses therefor in downhole applications. Although the term "nanosized" is used herein, it should be understood the disclosed particulates may range from nanometer size particulates to micrometer size particulates. The custom sized particulates are particularly effective as a diverting agent and for controlling fluid loss or leak off in fracturing operations, matrix injection rate operations, wellbore treatment operations, and other downhole operations where flow constriction or bridging (i.e., diversion) is of paramount consideration. The disclosed particulates may also be useful in any downhole operation that involves transporting particulates through sub-micrometer conduits or micro-fractures, thereby enabling far-field placement of particulates in a subterranean formation (i.e., greater than 12 inches beyond the borehole). Suitable viscosified fluids or liquid gel concentrates may be used to allow transport of the material into the formation as needed.

Figure 1:
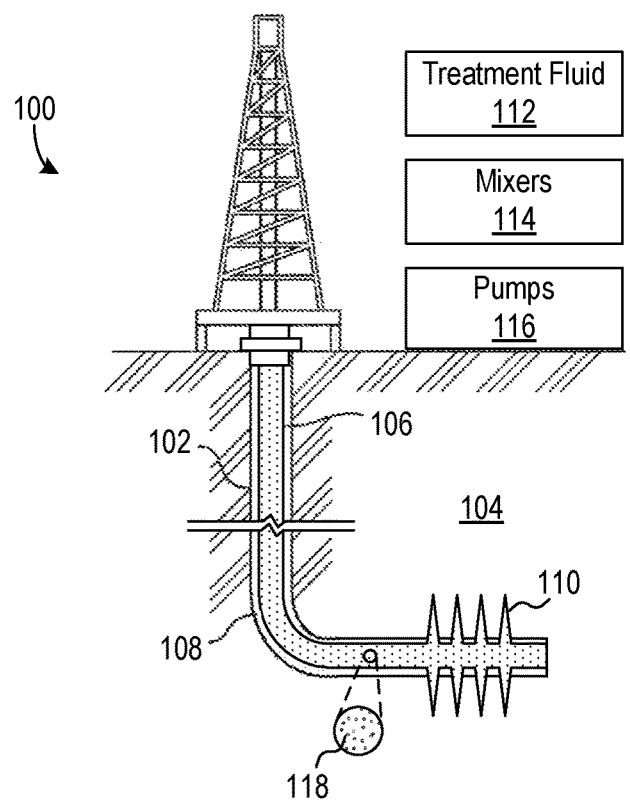
FIG. 1 illustrates an exemplary well in which nanosized particulates may be used according to the disclosed embodiments.

Referring now to FIG. 1, a partial view of a well 100 is shown in which nanosized particulates according to the embodiments disclosed herein may be used. The well 100 is shown here as being substantially horizontal, but the embodiments disclosed herein are equally applicable vertical or other types of wells, including wells that are inclined or deviate at various angles, both offshore and onshore. As can be seen, the well 100 has a wellbore 102 that extends into a subterranean formation 104 for extracting formation fluids (e.g., oil, gas, etc.) from the formation. Such a well 100 may be an open hole well, but is typically a cased well, as evidenced by the presence of a casing 106 surrounded by a cement sheath 108. The casing 106 has been perforated (e.g., via a perforating gun) along a portion thereof, resulting in a plurality of pathways 110 extending into the formation 104. Treatment fluid 112 from one or more storage tanks or tanker trucks (not expressly shown) may then be pumped down the well 100 using one or more high-pressure fluid pumps 114. The high-pressure fluid pumps 114 force the treatment fluid 112 down the casing 106, through the pathways 110, and into the formation 104 to create and propagate fractures in the formation. One or more mixers 116 may be used to prepare or finish preparing the treatment fluid 112 on-site as needed, including blending or otherwise combining the treatment fluid 112 with one or more additives prior to pumping it down the casing 106.

Figure 2:
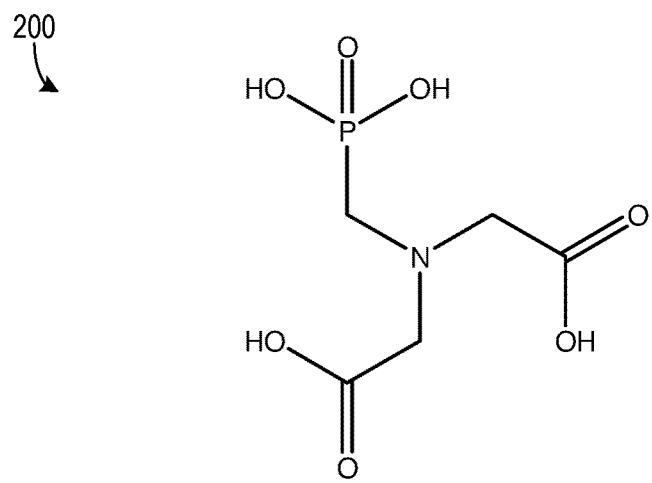
FIG. 2 illustrates an exemplary molecular structure for nanosized particulates according to the disclosed embodiments.

In accordance with the disclosed embodiments, the treatment fluid 112 contains nanosized particulates 118 suspended in a fluid therein that help control (i.e., prevent) fluid loss or alternatively act as a diverting agent. Preferably the particulates range in size from about 100 nm to about 50 µm, but may exceed this range in some embodiments depending on the particular implementation conditions. The nanosized particulates incorporate a neutralized (i.e., non-acidic) version of N-(Phosphonomethyl)iminodiacetic acid (PMIDA), which is a well-known agrochemical used worldwide. The chemical structure for PMIDA is depicted at 200 in FIG. 2. PMIDA in its native acidic form remains a solid in aqueous media and is slightly soluble (e.g., about 0.25% soluble at room temperature, about 4% soluble at 150° F.). Over time, this slight solubility allows full or nearly full post-treatment cleanup of the particulate material with little or no well intervention or work-over.

In some embodiments, the nanosized particulates may comprise a combination of PMIDA (or other N-(Phosphonoalkyl)iminodiacetic acids), a calcium source (e.g., $CaCl_2$), a pH adjusting agent (e.g., HCl, NaOH), and an aqueous medium (e.g., water). This combination results in a degradable (i.e., dissolvable) solid that can be used in heterogeneous formations like shale type rock reservoirs, as well as sedimentary rock formations like clastic, siliclastic, sandstone, limestone, calcite, dolomite, and chalk formations, and formations where there is large fluid leak-off due to stimulation treatments. The disclosed particulates may also be used with acidizing treatments in mature fields and deep water formations commonly characterized by high permeability matrices, and are compatible with graded (i.e., larger size) fluid loss agents like CaCO3, NaCl, polylactic acid (PLA), and the like. The solubility of the particulates advantageously allows the material to act as a temporary agent having a lifespan that is a function of temperature, water flux, and pH, resulting in particulates that can be adapted for various reservoir conditions with minimal or no risk of adverse effects on the reservoir.

Note that while N-(Phosphonoalkyl)iminodiacetic acids such as PMIDA are initially discussed herein, those having ordinary skill in the art understand many suitable alternatives may be used to synthesize the disclosed particulates. For example, other alkylated phosphonic acids such as phosphonotricarboxylic acid. For example, 1,2,4-phosphonobutanetricarboxylic acid (PBTCA), aminotris(methylenephosphonic acid) (ATMP), ethylenediaminetetra(methylenephosphonic acid) (EDTMP), diethylenetriaminepenta (methylenephosphonic acid) (DTPMP), hexamethylenediaminetetra(methylenephosphonic acid) (HDTMP), bishexamethylenetriaminepenta (methylenephosphonic acid) (BHMTMP), and phosphonate ester derivatives may be used instead of PMIDA in some embodiments.

Similarly, many suitable sources of calcium in addition to sodium chloride may be used to synthesize the disclosed particulates. Examples of suitable calcium sources may include calcium carbonate, calcium bicarbonate, calcium hydroxide or calcium oxide, calcium nitrate and salts thereof, calcium bromide, and other calcium bearing minerals. Calcium hydroxide ($CaOH_2$), for example, may be used both to neutralize the alkylated phosphonic acid and provide a calcium source in some embodiments.

Figure 3:
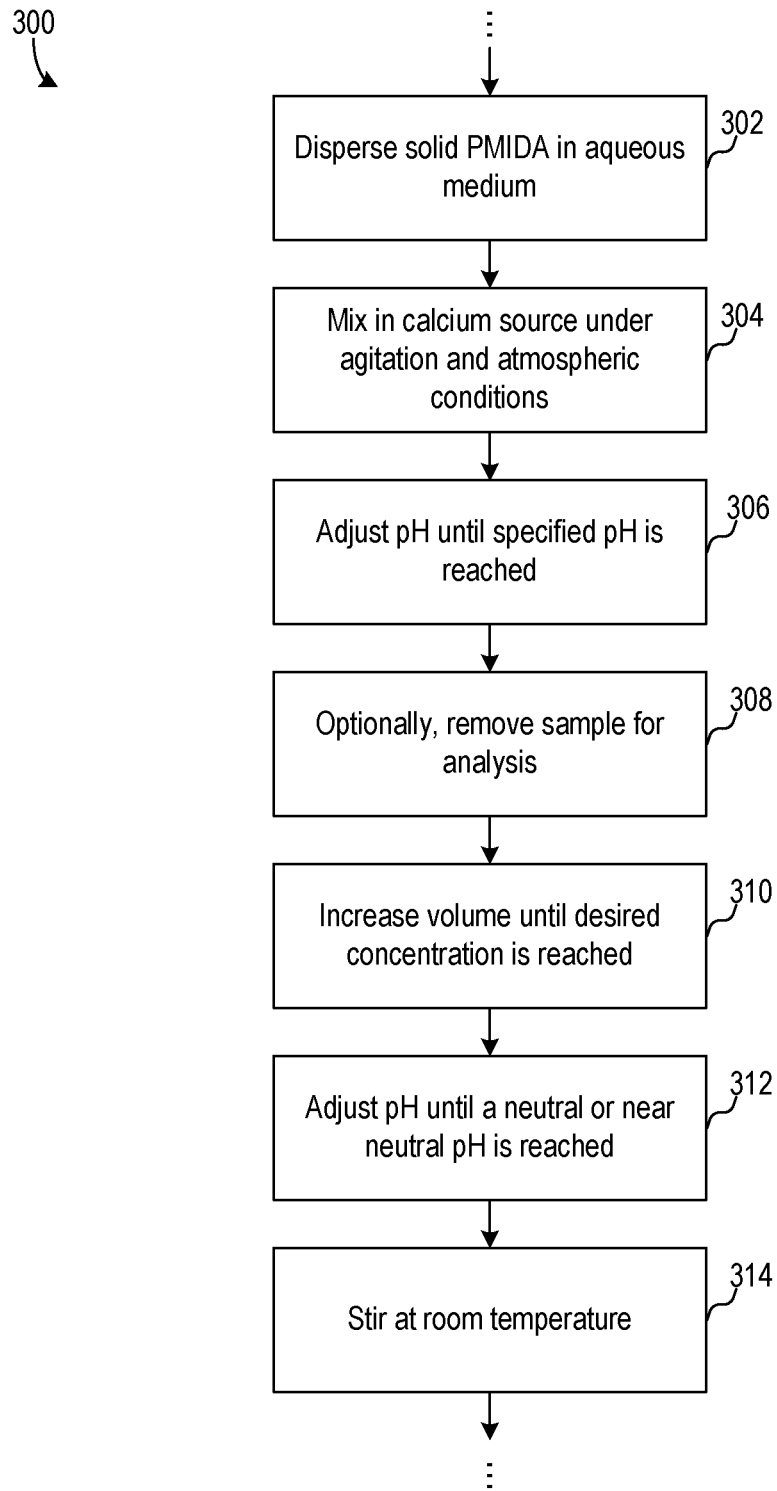
FIG. 3 illustrates an exemplary method of synthesizing nanosized particulates according to the disclosed embodiments.

FIG. 3 illustrates a flowchart 300 of an exemplary method for preparing nanosized particulates according to the disclosed embodiments. It should be understood the flowchart 300 provides only general guidelines and alternative methods may be employed without departing from the scope of the disclosed embodiments. Thus, for example, while a number of discrete blocks are shown in FIG. 3, those having ordinary skill in the art will understand that two or more blocks may be combined without departing from the scope of the disclosed embodiments. Similarly, one or more blocks may be divided into multiple blocks and/or taken out of the sequence shown (or omitted) without departing from the scope of the disclosed embodiments.

The flowchart 300 generally begins at block 302, where solid PMIDA (or another N-(Phosphonoalkyl)iminodiacetic acid) is dispersed in an aqueous medium, such as water. At block 304, a calcium source, such as calcium chloride ($CaCl_2$), is mixed into the solution while undergoing agitation (e.g., in a magnetic agitator) at atmospheric conditions. This produces a suspension containing a slightly soluble metal complex (i.e., Ca-PMIDA). At block 306, the pH of the suspension is adjusted, for example, by gradually adding a pH adjusting agent like Bronstead acid or metal hydroxide until the suspension reaches a specified pH level, which may be a pH of 10 in some embodiments. Examples of suitable Bronstead acid include hydrochloric acid, nitric acid, methane sulfonic acid, formic acid, sulfamic acid, lactic acid, chloroacetic acid, dichloroacetic acid, trichloroacetic acid, hydroiodic acid. Examples of suitable metal hydroxide include sodium hydroxide, potassium hydroxide, and ammonium hydroxide. As an optional step, at block 308, the suspension may be stirred and an aliquot removed for testing and analysis. At block 310, the volume of the suspension is increased, for example, by adding additional water or other aqueous medium until the suspension reaches a specified concentration (e.g., 100 ppm). At block 312, the pH of the suspension may be further adjusted, for example, by adding a pH adjusting agent like HCl or NaOH until a neutral or near neutral pH is reached, for example, a pH of 5.8, 6.8, 7.0, 7.5, and the like, with the final pH depending on the conditions of the target reservoir. Thereafter the suspension may be allowed to stir at room temperature for about 30 minutes or other suitable period of time.

The result of the above preparation method is a suspension containing solid nanosized Ca-PMIDA particulates that can be introduced into the formation. The particulates may range from dust sized (i.e., <<50 μm) to micrometer sized particles, or they may be agglomerated/comminuted into millimeter sized pellets. These particulates display similar physical characteristics to commercially available fluid loss control compounds like BioVert CF™ or MicroScout™ from Halliburton Energy Services, Inc., insofar as they have the ability to physically plug pore throats and lower the porosity of discontinuous formation matrices, such as fracture networks or other natural fractures formed in a formation.

Despite any similarities, the disclosed particulates provide a number of advantages not available in existing fluid loss control materials, including ease of cleanup and low cost. For example, nearly complete or complete cleanup of a stimulated zone after treatment may be realized without the need for additional treatments, work-overs or restorative actions because the disclosed particulates degrade (dissolve) over time with residual stimulation fluids or produced water. And because their precursor material is commercially available worldwide in bulk (e.g., million ton scale), the disclosed particulates are also lower in cost relative to other fluid loss control materials.

Example 1—Preparation of
Nano/Micro-Particulated Ca-PMIDA

In one example, a suspension of nano/micro-particulated Ca-PMIDA was prepared by dispersing 5 g of solid PMIDA in 100 mL water. Next, 25 mL of $CaCl_2$ (11.6 lbs/gal) was added to the solution while under magnetic agitation at atmospheric conditions. The resulting suspension was adjusted with NaOH (saturated solution) by gradually adding 15 mL until a pH of 10 was reached. At this point the suspension was stirred and samples were removed for analysis. Water was then added to adjust the final volume of the suspension to 100 ppm. The suspension was further adjusted with addition of HCl 37% weight/volume until a near neutral pH (6.8) was reached. The suspension was thereafter allowed to stir for 30 minutes at room temperature.

Table 1 below shows a size fraction analysis for the particular suspension synthesized above. For Sample 1, roughly 10% of the particles had a diameter smaller than about 103 nm, 50% of the particles had a diameter smaller than about 286 nm, and 90% of the particles had a diameter smaller than about 1.34 μm. Similarly for Sample 2, roughly 10% of the particles had a diameter smaller than about 93.9 nm, 50% of the particles had a diameter smaller than about 256 nm, and 90% of the particles had a diameter smaller than about 1.29 μm. Thus, the particles seem to have an average size of about 100 nm, 250 nm, and 1.3 μm for the 10%, 50%, and 90% distribution, respectively.

TABLE 1

Fraction analysis of Ca-PMIDA suspension (pH 6.8)

| Sample # | D10 (μm) | D50 (μm) | D90 (μm) |
|---|---|---|---|
| 1 | 0.103 | 0.286 | 1.34 |
| 2 | 0.0939 | 0.256 | 1.29 |

Figure 4:
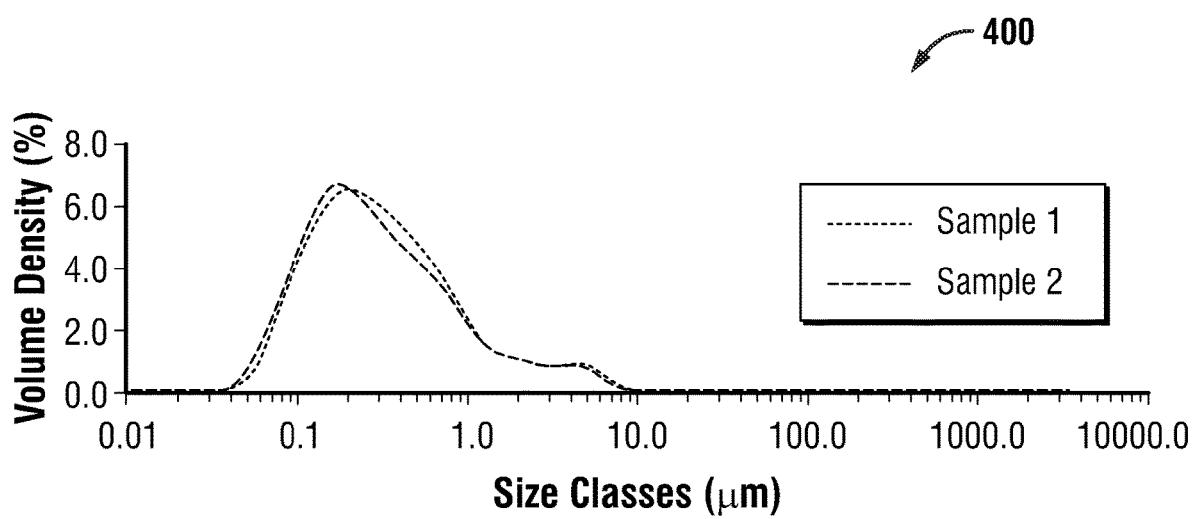
FIG. 4 illustrates an exemplary particle size distribution for nanosized particulates according to the disclosed embodiments.

FIG. 4 graphically illustrates the size distribution from Table 1 via a graph 400 in which the vertical axis represents the population distribution in terms of volume density (%) and the horizontal axis represents particle size (μm). As can be seen from the lines in the graph, the highest number of particles had a size of about 110 nm, while some particles were as small as 40 nm and some were as large as 10 μm.

Figure 5:
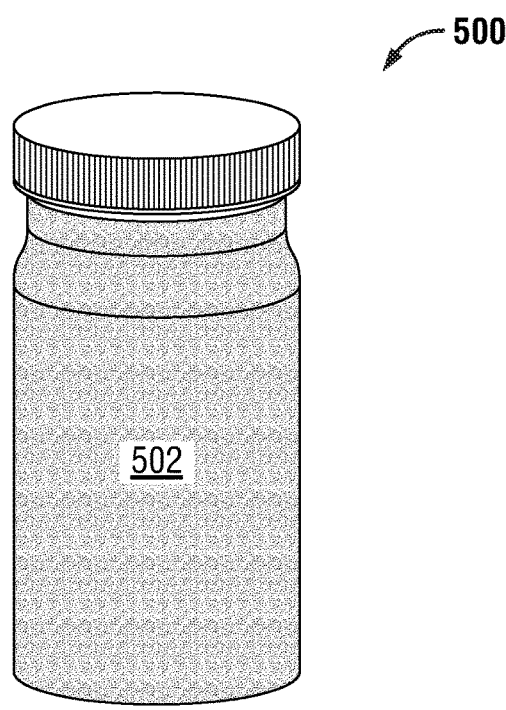
FIG. 5 illustrates an exemplary solution containing nanosized particulates according to the disclosed embodiments.

FIG. 5 shows a jar 500 containing a suspension 502 of nanosized Ca-PMIDA particulates according to the embodiments disclosed herein. The suspension remained stable after being aged at room temperature for four weeks (or longer). After two weeks the suspension remained fluid (i.e., it can flow), there was no noticeable thickening, and only a negligible degree of settling was observed, as evident by the absence of a clear layer above the suspension. After four weeks some slight particle segregation was seen, but the entire suspension was able to be re-homogenized with minimal agitation.

Thus, the Ca-PMIDA particulates disclosed herein provide a number of benefits over existing fluid control additives. For example, some existing fluid control materials claim to use the acid form of a scale inhibitor, but in actuality none can actually be utilized as such due to very high solubility, unless a metal salt (e.g., calcium and/or magnesium salt) is used. Moreover, certain phosphonates are not soluble in the presence of trivalent ions like $Fe^{3+}$ (ferric) or aluminum. The disclosed particulates are introduced in the form of $[Ligand-Ca_x]_n$, where x can be any suitable value (e.g., from 2 to 5) and n can also be any suitable value (e.g., from 1 to 4), and the ligand is PMIDA and does not depend on in-situ (i.e., downhole) formation of a reaction product of a multivalent cation with the anionic form of the phosphonate. Nor does the disclosed particulates rely on borate or boron-containing materials or PLA, which can have a pH-dependent solubility range, but can also complicate the actual use of such material due to its potential to interfere with carrier gelled fluids (which can be sensitive to such type of materials).

An additional benefit is the size of the particulates can be modified or customized as needed based on the particular composition (i.e., by adjusting the amount of calcium chloride, PMIDA concentration, specified pH level, volume of water, etc.). As mentioned previously, the disclosed particulates are degradable with prolonged exposure to formation conditions (e.g., water, temperature, pH, etc.). Particulate size distribution may also be controlled to specification, either at the point of origin or at a chemical processing plant. The particulates are nano to micron size and hence they can be transported into complex fractures (i.e., micro-fractures). They are not a polymeric material and thus have a lesser tendency to induce proppant damage due to residual polymer interaction with dissolved minerals. The pre-synthesized materials can be transported in solid form, thereby eliminating liquid transportation and associated costs. And the synthesized nano- and micro-particulates can be dissolved as a function of concentration and/or pH level.

The above and other benefits allow the disclosed particulates to be particularly effective for stimulation treatment where a high degree of variability and unknowns are present in a well and/or formation, thereby minimizing risk of formation damage or other adverse risks due to inadequate or improper use of materials. As well, PMIDA is a scale inhibitor at the pH of the suspension—it will dissolve over time having physio-chemical potential. And because the particulates degrade (solubilizes) as a function of time, they enable self-cleanout after treatment. The particulates are also compatible with slickwater (polyacrylamide-based) treatments and with fracturing gels. They have a lower Health-Safety-Environment (HSE) profile compared to conventional sub-micron particulates and do not generate dust on site/location, as the material can be generated in solution phase. Lower cost overall may be realized due to the availability of constituent materials (i.e., calcium source, PMIDA, water, NaOH and HCl. In some embodiments, a flow enhancer or surfactant may be needed to assist flow.

Accordingly, as set forth above, the embodiments disclosed herein may be implemented in a number of ways. For example, in general, in one aspect, the disclosed embodiments may relate a method of performing a well treatment. The method comprises, among other things, pumping a treatment fluid down a wellbore and into a subterranean formation, where the treatment fluid includes a plurality of degradable submicron and micron particulates suspended therein that minimize fluid leak-off into the formation, the particulates being composed of a calcium source combined with alkylated phosphonic acid. The method further comprises removing the particulates from the formation, where the particulates are removed by allowing them to degrade over time.

In accordance with any one or more of the foregoing embodiments, the particulates range in size from about 100 nm to about 50 μm.

In accordance with any one or more of the foregoing embodiments, the alkylated phosphonic acid is one of a neutralized version of N-(Phosphonomethyl)iminodiacetic acid, 1,2,4-phosphonobutanetricarboxylic acid (PBTCA), aminotris(methylenephosphonic acid) (ATMP), ethylenediaminetetra(methylenephosphonic acid) (EDTMP), diethylenetriaminepenta(methylenephosphonic acid) (DTPMP), hexamethylenediaminetetra(methylenephosphonic acid) (HDTMP), bishexamethylenetriaminepenta (methylenephosphonic acid) (BHMTMP), or phosphonate ester derivatives.

In accordance with any one or more of the foregoing embodiments, the calcium source is one of: calcium chloride; calcium carbonate; calcium bicarbonate; calcium oxide, calcium hydroxide; calcium nitrate and salts thereof; or calcium bromide.

In accordance with any one or more of the foregoing embodiments, the subterranean formation is one of a sedimentary rock formation or a heterogeneous formation. In some embodiments, the sedimentary rock formation is one of a clastic, siliclastic, sandstone, limestone, calcite, dolomite, or chalk formation, and the heterogeneous formation is a shale type rock reservoir.

In accordance with any one or more of the foregoing embodiments, the well treatment is performed as part of one of a fracturing operation, a matrix injection rate operation, or a wellbore treatment operation.

In accordance with any one or more of the foregoing embodiments, pumping is performed using one or more pumps located at the well.

In accordance with any one or more of the foregoing embodiments, the treatment fluid is prepared using one or more mixers located at the well.

In accordance with any one or more of the foregoing embodiments, the particulates are allowed to degrade without additional treatments, workovers, or restorative actions.

In general, in another aspect, the disclosed embodiments may relate to a method of synthesizing submicron and micron particulates for downhole applications. The method comprises, among other things, dispersing alkylated phosphonic acid in an aqueous medium to form a solution and mixing a calcium source into the solution while the solution is undergoing agitation to produce a suspension. The method further comprises adjusting a pH of the suspension until the suspension reaches a specified pH and increasing a volume of the suspension until the suspension reaches a specified concentration. The pH of the suspension is then adjusted until the suspension reaches a near neutral pH.

In accordance with any one or more of the foregoing embodiments, the alkylated phosphonic acid is one of a neutralized version of N-(Phosphonomethyl)iminodiacetic acid, 1,2,4-phosphonobutanetricarboxylic acid (PBTCA), aminotris(methylenephosphonic acid) (ATMP), ethylenediaminetetra(methylenephosphonic acid) (EDTMP), diethylenetriaminepenta(methylenephosphonic acid) (DTPMP), hexamethylenediaminetetra(methylenephosphonic acid) (HDTMP), bishexamethylenetriaminepenta (methylenephosphonic acid) (BHMTMP), or phosphonate ester derivatives.

In accordance with any one or more of the foregoing embodiments, the calcium source is one of: calcium chloride; calcium carbonate; calcium bicarbonate; calcium oxide, calcium hydroxide; calcium nitrate and salts thereof; or calcium bromide.

In accordance with any one or more of the foregoing embodiments, the aqueous medium is water.

In accordance with any one or more of the foregoing embodiments, adjusting the pH comprises adding one of Bronstead acid or metal hydroxide to the suspension, the Bronstead acid being one of hydrochloric acid, nitric acid, methane sulfonic acid, formic acid, sulfamic acid, lactic acid, chloroacetic acid, dichloroacetic acid, trichloroacetic acid, or hydroiodic acid, and the metal hydroxide being one of sodium hydroxide, potassium hydroxide, or ammonium hydroxide.

In accordance with any one or more of the foregoing embodiments, the size of the particulates depends on one or more of an amount of calcium source, concentration of alkylated phosphonic acid, volume of aqueous medium, and specified pH.

In general, in yet another aspect, the disclosed embodiments may relate to a well treatment fluid. Though well treatment fluid comprises, among other things, a suspension and a plurality of degradable submicron and micron particulates suspended in the suspension. The treatment fluid is formed by combining a calcium source, alkylated phosphonic acid, a pH adjusting agent, and an aqueous medium.

In accordance with any one or more of the foregoing embodiments, the particulates range in size from 100 nm to 50 μm.

In accordance with any one or more of the foregoing embodiments, the calcium source is one of: calcium chloride; calcium carbonate; calcium bicarbonate; calcium oxide, calcium hydroxide; calcium nitrate and salts thereof; or calcium bromide.

In accordance with any one or more of the foregoing embodiments, the alkylated phosphonic acid is one of a neutralized version of N-(Phosphonomethyl)iminodiacetic acid, 1,2,4-phosphonobutanetricarboxylic acid (PBTCA), aminotris(methylenephosphonic acid) (ATMP), ethylenediaminetetra(methylenephosphonic acid) (EDTMP), diethylenetriaminepenta(methylenephosphonic acid) (DTPMP), hexamethylenediaminetetra(methylenephosphonic acid) (HDTMP), bishexamethylenetriaminepenta (methylenephosphonic acid) (BHMTMP), or phosphonate ester derivatives.

In accordance with any one or more of the foregoing embodiments, wherein the aqueous medium is water.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A method of performing a well treatment, comprising:
   receiving a treatment fluid suspension comprising a basic pH and a plurality of degradable submicron and micron particulates suspended in the treatment fluid suspension that minimize fluid leak-off into a subterranean formation, the particulates being composed of a calcium source combined with alkylated phosphonic acid;
   adjusting the pH of the treatment fluid suspension to a near neutral pH;
   pumping the treatment fluid suspension down a wellbore and into the subterranean formation; and
   removing the particulates from the subterranean formation, wherein the particulates are removed by allowing them to degrade over time.

2. The method of claim 1, wherein the particulates range in size from about 100 nm to about 50 µm.

3. The method of claim 2, wherein the alkylated phosphonic acid is one of a neutralized version of N-(Phosphonomethyl)iminodiacetic acid, 1,2,4-phosphonobutanetricarboxylic acid (PBTCA), aminotris(methylenephosphonic acid) (ATMP), ethylenediaminetetra(methylenephosphonic acid) (EDTMP), diethylenetriaminepenta(methylenephosphonic acid) (DTPMP), hexamethylenediaminetetra(methylenephosphonic acid) (HDTMP), bishexamethylenetriaminepenta (methylenephosphonic acid) (BHMTMP), or phosphonate ester derivatives.

4. The method of claim 3, wherein the calcium source is one of: calcium chloride; calcium carbonate; calcium bicarbonate; calcium oxide, calcium hydroxide; calcium nitrate and salts thereof; or calcium bromide.

5. The method of claim 4, wherein the subterranean formation is one of a sedimentary rock formation or a heterogeneous formation.

6. The method of claim 5, wherein the sedimentary rock formation is one of a clastic, siliclastic, sandstone, limestone, calcite, dolomite, or chalk formation.

7. The method of claim 5, wherein the heterogeneous formation is a shale type reservoir rock.

8. The method of claim 7, wherein the well treatment is performed as part of one of a fracturing operation; a matrix injection rate operation; or a wellbore treatment operation.

9. The method of claim 8, wherein pumping is performed using one or more pumps located at a well.

10. The method of claim 9, further comprising preparing the treatment fluid suspension using one or more mixers located at the well.

11. The method according to claim 1, wherein the particulates are allowed to degrade without additional treatments, workovers, or restorative actions.

* * * * *